Patented Oct. 2, 1934

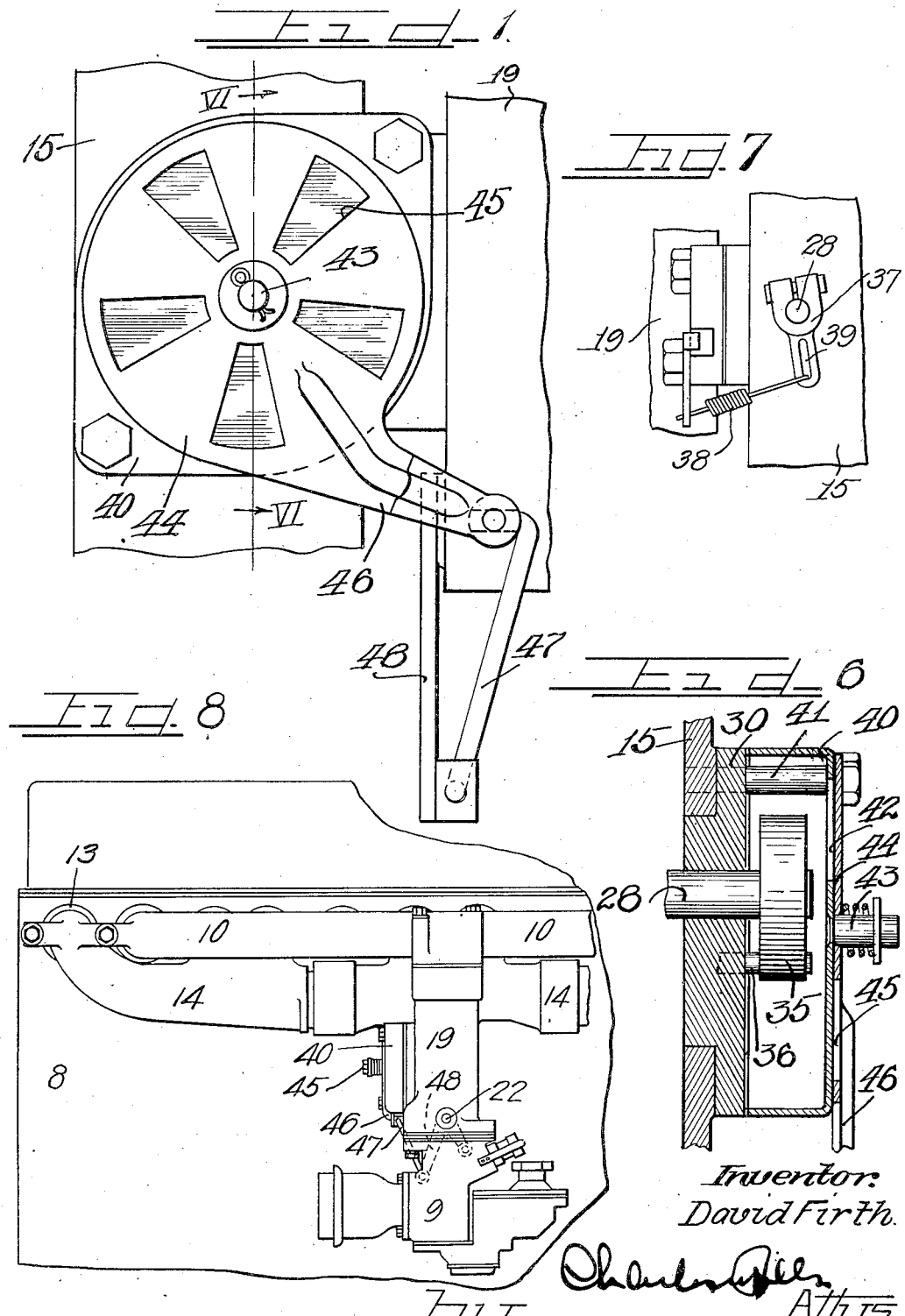

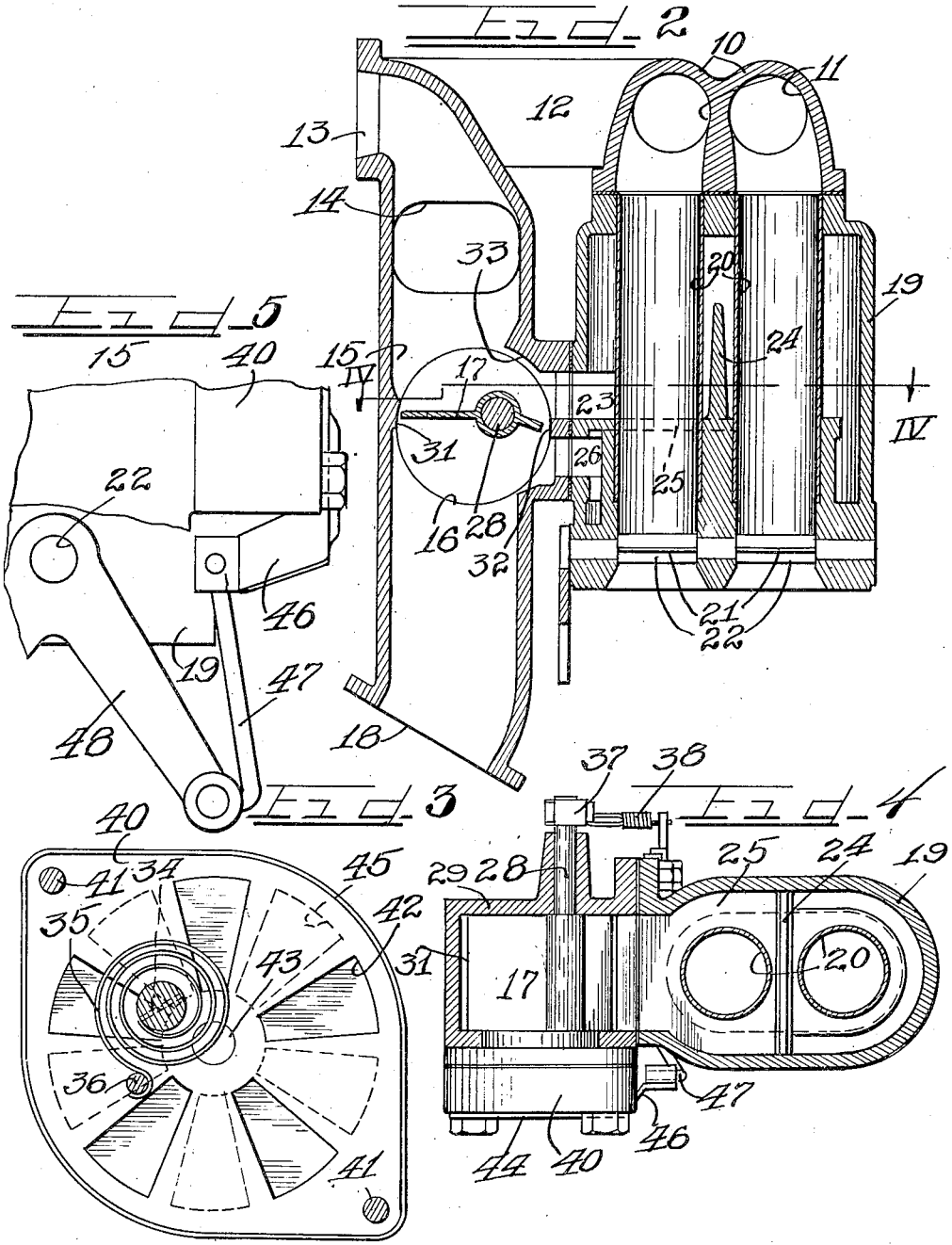

1,975,093

UNITED STATES PATENT OFFICE 1,975,093

AUTOMATIC HEAT CONTROL FOR CARBURETORS

David Firth, Flint, Mich., assignor to Marvel Carbureter Company, Flint, Mich., a corporation of Illinois Application August 22, 1932, Serial No. 629,856

11 Claims. (Cl. 123—122)

This invention relates to an improved thermostatic heat control for the induction system of internal combustion engines and has special reference to an automatic control of the heat supplied to the induction system, modified by controlling the cooling of the thermostat in accordance with the power demand on the engine.

It is an object of this invention to provide an improved and simplified thermostatic heat control adapted to automatically compensate for variations in the available heat supply and to modify the controlling temperature of the induction system by a variable cooling of the thermostat in proportion to variations in the power demand on the engine. A variable temperature in the induction system is highly desirable since smoothness of operation at light loads or idling requires a maximum heating of the induction system at a time when the heating fluid available is at a lower temperature and small volume of flow while for maximum engine output the heating effect should be at a minimum while the heating fluid is then available at a high temperature and greatly increased volume and pressure. I accomplish these objects by providing an unbalanced valve controlling the diversion of exhaust gases for heating the induction system and controlling this valve by a spring type of thermostat, varying the thermostat response by means of shutters controlling air circulation thereabout, the shutters being operated by a throttle control, since the throttle position affords a convenient index of the power demands on the engine; and hence of the desirable heating effect required for best results in the induction system.

It is another object of this invention to provide an improved heat control system for the intake manifold of an internal combustion engine comprising an unbalanced diversion valve so mounted in the exhaust manifold as to divert the exhaust gases into a heating jacket on the intake manifold and arranged to be moved from its diverting position by the pressure of exhaust gases thereon, this movement being variably resisted by a thermostatic control the operation of which is modified by varying the air circulation thereabout by a throttle control, to provide a variable heating effect on the intake manifold which is at a maximum under idling conditions with a cold engine.

It is a further object of this invention to provide an improved and simplified heat control system for the purpose described wherein an unbalanced heat control valve is provided with a yielding stop to absorb vibrations in the valve caused by periodic pulsations in the pressure acting on the valve.

Other and further important objects of this invention will be apparent from the disclosures in the specification and the accompanying drawings.

This invention (in a preferred form) is illustrated in the drawings and hereinafter more fully described:

On the drawings:

Figure 1 is a fragmentary elevation, with parts broken away, of the exhaust and induction systems of an internal combustion engine embodying the features of this invention.

Figure 2 is a central section, partly in elevation; taken parallel to the view of Fig. 1 showing the exhaust diversion valve and the heating jacket for the induction system.

Figure 3 is a rear view of the thermostat cover shown in Fig. 1.

Figure 4 is a section on the line IV—IV of Fig. 2;

Figure 5 is a fragmentary view of the left side of Fig. 1.

Figure 6 is a section on the line VI—VI of Fig. 1; and

Figure 7 is a view of the yielding stop for the diversion valve, corresponding to a top view of Figure 4.

Figure 8 is a fragmentary side elevation of an engine and its manifolding systems having an embodiment of this invention applied thereto.

The heating system of this invention has been illustrated in connection with a dual type of intake manifold 10 having separate passages 11 feeding groups of cylinders cast into an engine block 8 through branches, one of which is shown at 12 in Fig. 2. It is common practice to have a row of alternating exhaust and intake port connections, one exhaust connecting flange being shown at 13 which feeds into an exhaust manifold 14 conveniently located beneath the various intake manifold branches 12. An exhaust outlet passage 15 leads downwardly from the manifold 14 and contains a diversion valve chamber 16 formed as a cylinder transversely disposed in the passage and open at the front for insertion of a diversion valve 17, to be later described. Below the valve chamber, the exhaust passage terminates in a mounting flange 18 for the attachment of the usual exhaust pipe.

The intake manifold 10 is fed by a riser casting 19 to which a carburetor 9 is attached, the riser forming a heating jacket about tubes 20 which form riser passages from the carburetor to the manifold 10, twin throttle valves 21 on a common shaft 22 being located at the lower end of the riser. The use of relatively thin tubes 20 inserted in the heating jacket casting facilitates heat transfer to the mixture flowing therethrough and is therefore my preferred construction, although it will be understood that such a construction is not essential to this invention. Also, while my invention is illustrated in connection with a dual type of intake manifold, it will be evident that it is equally applicable to a single type, not shown, since my invention relates to the control of the heat supply to the heating jacket 19.

The valve chamber 16 is connected by a passage 23 to the heating jacket 19, the exhaust gas flowing up around the tubes 20 and over a baffle 24 therebetween, thence through the lower part of the jacket beneath a baffle 25 to an outlet passage 26 opening into the valve chamber below the first passage 23.

The unbalanced diversion or damper valve 17 is mounted on a shaft 28 journaled in offset relationship to the axis of the valve chamber, one end of the shaft extending through the rear wall 29 of the chamber while the front end extends through a cover or cap 30 closing the front of the chamber. The overhanging or wide edge of the valve cooperates with a land 31 on the chamber wall to cause a deflection of the exhaust gases into the passage 23 while the narrow side of the valve cooperates with a land 32 between the two passages 23 and 26, the valve opening in an anti-clockwise direction in Figure 2 in response to exhaust pressure. During the opening movement the narrow side of the valve approaches a land 33 above the passage 23 but this land may be purposely cut back a predetermined amount to allow a certain amount of exhaust gas flow to the heating jacket even with the valve open.

The front end of the shaft 28 is slotted at 34 to receive one end of a coiled bimetallic thermostatic member 35 the other end of which is hooked to a pin 36 anchored to the cover 30. Thus the thermostat is subjected to heat radiated through the cover 30 as well as conducted along the shaft 28, the heating effect being modified by air circulation about the thermostat coils, the thermostat being purposely spaced from the cover 30 to permit such air circulation.

The valve 17 is not provided with an abutment defining its closed or diverting position because a solid stop would cause pounding of the valve due to pulsations in the exhaust gas flow. A yielding stop is provided on the projecting rear end of the shaft 28, which has a lever 37 applied thereto and engaged by a spring 38 which spring in its normal contracted position defines the desired valve diverting or closed position. The valve may however swing past the normal position by stretching the spring 38 which is proportioned to yield before the thermostat is subjected to damaging strains. The lever 37 is provided with an elongated slot 39 into which one end of the spring is hooked, the slot providing sufficient lost motion or play to permit normal or clockwise opening movement of the valve as shown in Fig. 7.

The thermostat is covered by a shield 40 mounted on spacer studs 41 which allow a circulation of air under the edges of the shield to modify the responsiveness of the thermostat to heat conducted along the valve shaft 28 and radiated from the valve chamber cover 30.

The shield 40 is provided with a number of ports 42 radially disposed relative to a pivot pin 43, and a shutter 44 is pivoted on the pin and is provided with similar ports 45, the shutter being rotated to align or close the two sets of ports 42 and 45. While the shutter may be manually rotated, I prefer to provide an automatic control from the throttle and to this end I provide the shutter with the lever 46 linked by a rod 47 to a lever 48 on the throttle shaft 22. The linkage is such that the ports tend to come into alignment to permit increased air flow as the throttles move from the open position towards the idling or part load position.

In describing the operation of the heat control of this invention it will be convenient to refer to Figure 2 to visualize the path of the exhaust gases from the diversion valve through the port 23 to the heating jacket 19 about the intake manifold passages and thence back to the exhaust manifold through the port 26. The increased exhaust pressure generated by an engine operating under loads above idling acts to swing the valve 27 in a counter-clockwise direction to open a direct exhaust outlet, correspondingly decreasing the flow through the heating jacket. The exhaust pressure may be sufficient to fully open the valve 27 at which position the short side of the valve clears the land 33 by an amount predetermined by the desired flow of heating fluid under maximum power conditions.

The thermostat 35 yieldingly opposes the opening movement of the valve in accordance with the temperature attained. Under exceptional conditions such as long continued high power operation or very hot weather the thermostat may expand sufficiently to practically release all tension on the valve, while at the other extreme of cold starting the thermostat will provide the maximum resistance to valve opening and thus control the heat supply to the intake manifold.

The temperature responsiveness of the thermostat is due to the net balance of radiated and conducted heat from the exhaust manifold as modified by the air flow about the thermostat, so that by closing the shutter ports the thermostat will be more responsive to exhaust heat and will hence maintain a lower temperature in the intake manifold. On the other hand, opening the shutter ports will allow a cooling air circulation about the thermostat which renders it less responsive to exhaust temperatures, resulting in an increase in temperature in the intake manifold.

The shutter is linked to the throttles in such a way as to open or align the ports when the throttles are nearly closed for part load operation and to gradually overlap the ports as the throttles are opened until the ports are completely closed when the throttles approach full opening. The shutter need not be limited in movement by the width of the ports since under idling conditions the valve 17 is fully closed, so that the ports may be partly closed at idling and open up for part load conditions when the exhaust pressure otherwise increases sufficiently to affect the valve position. As an example the part load conditions which require the maximum intake heating may correspond to about 60 miles per hour on a level road, and after this throttle position is passed the ports begin to close again and become fully closed at some degree before full throttle opening.

It will thus be seen that I provide an unbalanced diversion valve normally closed against a resilient stop and resiliently held closed by a thermostat opposed in its action to the pressure of the exhaust gases on the unbalanced valve; the effective heating and cooling of the thermostat being controlled by air circulation shutters linked to the engine throttle.

While this invention has been hereinabove described in a preferred form, namely embodying an unbalanced valve, it is to be understood that other constructions can be made without departing from the spirit of the invention. For example, a balanced valve may be used and the yielding stop eliminated, since the balanced valve would not be subject to the opening effect of exhaust gas pressure, all in a manner deemed obvious from the disclosure herein. As an additional example, while the air circulation around the thermostat is indirectly manually controlled through the throttle mechanism, various other types of control might be substituted as will be apparent to one skilled in the art.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A heat control for the manifolding systems of internal combustion engines including a heating jacket associated with the intake manifold and connections for supplying exhaust gases from the exhaust manifold to said heating jacket, an unbalanced diversion valve located in the exhaust manifold to divert the flow of exhaust gases through said heating jacket, said valve being arranged to be opened by the pressure of exhaust gases thereon, thermostatic means adapted to resist said opening movement of the valve in response to exhaust pressure thereon, and a yielding stop defining the diverting position of said valve whereby to prevent pounding of the valve in response to pulsation in the exhaust flow.

2. A heat control for the manifolding systems of internal combustion engines including a heating jacket associated with the intake manifold and connections for supplying exhaust gases from the exhaust manifold to said heating jacket, an unbalanced diversion valve located in the exhaust manifold to divert the flow of exhaust gases through said heating jacket, said valve being arranged to be opened by the pressure of exhaust gases thereon, thermostatic means adapted to resist said opening movement of the valve in response to exhaust pressure thereon, means for varying the effective temperature responsiveness of said thermostat by varying the circulation thereabout, and a yielding stop defining the diverting position of said valve whereby to prevent pounding of the valve in response to pulsation in the exhaust flow.

3. A heat control for the manifolding systems of internal combustion engines including a heating jacket associated with the intake manifold and connections for supplying exhaust gases from the exhaust manifold to said heating jacket, an unbalanced diversion valve located in the exhaust manifold to divert the flow of exhaust gases through said heating jacket, said valve being arranged to be opened by the pressure of exhaust gases thereon, thermostatic means adapted to resist said opening movement of the valve in response to exhaust pressure thereon, and throttle operated means adapted to vary the air circulation about said thermostat, whereby to variably cool the same to modify the temperatures attained in the heating jacket in proportion to the throttle movement.

4. A heat control for the manifolding systems of internal combustion engines including a heating jacket associated with the intake manifold and connections for supplying exhaust gases from the exhaust manifold to said heating jacket, an unbalanced diversion valve located in the exhaust manifold to divert the flow of exhaust gases through said heating jacket, said valve being arranged to be opened by the pressure of exhaust gases thereon, thermostatic means adapted to resist said opening movement of the valve in response to exhaust pressure thereon, a yielding stop defining the diverting position of said valve whereby to prevent pounding of the valve in response to pulsations in the exhaust flow, and throttle operated means adapted to vary the air circulation about said thermostat, whereby to variably cool the same to modify the temperatures attained in the heating jacket in proportion to the throttle movement.

5. A heat control for the intake manifold heating system of an internal combustion engine including an unbalanced valve for diverting exhaust gases from the exhaust manifold to a heating jacket on the intake manifold, said unbalanced valve being adapted to be opened to by-pass the exhaust gases away from the heating jacket by the pressure of the gases on said valve, a thermostat yieldingly opposing the opening movement of said valve, said thermostat being heated by the exhaust gases adjacent said valve, and means for controlling access of cooling air to said thermostat to vary the response thereof to the heat of the exhaust gases.

6. A heat control for the intake manifold heating system of an internal combustion engine including an unbalanced valve for diverting exhaust gases from the exhaust manifold to a heating jacket on the intake manifold, said unbalanced valve being adapted to be opened to bypass the exhaust gases away from the heating jacket by the pressure of the gases on said valve, a thermostat yieldingly opposing the opening movement of said valve, said thermostat being heated by the exhaust gases adjacent said valve and a yielding stop defining the diverting position of said valve and adapted to prevent pounding of said valve under pressure fluctuations in the exhaust gases.

7. A heat control for the intake manifold heating system of an internal combustion engine including an unbalanced valve for diverting exhaust gases from the exhaust manifold to a heating jacket on the intake manifold, said unbalanced valve being adapted to be opened to bypass the exhaust gases away from the heating jacket by the pressure of the gases on said valve, a thermostat yieldingly opposing the opening movement of said valve, said thermostat being heated by the exhaust gases adjacent said valve, and throttle operated means adapted to vary the air circulation about said thermostat to vary the responsiveness thereof to exhaust heat.

8. A heat control for the intake manifold heating system of an internal combustion engine including an unbalanced valve for diverting exhaust gases from the exhaust manifold to a heating jacket on the intake manifold, said unbalanced valve being adapted to be opened to bypass the exhaust gases away from the heating jacket by the pressure of the gases on said valve, a thermostat yieldingly opposing the opening movement of said valve, said thermostat being heated by the exhaust gases adjacent said valve, a yielding stop defining the diverting position of said valve and adapted to prevent pounding of said valve under pressure fluctuations in the exhaust gases, and throttle operated means adapted to vary the air circulation about said thermostat to vary the responsiveness thereof to exhaust heat.

9. A heat control for the manifolding systems of an internal combustion engine, including a heating jacket associated with the intake manifold, connections for supplying exhaust gases from the exhaust manifold to said heating jacket, a diversion valve located in the exhaust manifold to control the flow of gases to said heating jacket, thermostatic means for controlling said valve, and throttle operated means for varying the air circulation about said thermostatic means to variably cool the same to modify the temperatures attained in the heating jacket in proportion to the throttle movement.

10. A heat control for the manifolding system of an internal combustion engine, including a heating jacket associated with the intake manifold, means establishing communication between the exhaust manifold and said jacket, valve means for controlling the diversion of exhaust gases from the exhaust manifold to said heating jacket, thermostatic means for effecting a control of said valve means, and means for varying the temperature conditions to which said thermostatic means is exposed.

11. A heat control for the manifolding system of an internal combustion engine, including a heating jacket associated with the intake manifold, means establishing communication between the exhaust manifold and said jacket, valve means controlling the diversion of exhaust gases from the exhaust manifold to said jacket, thermostatic means tending to resist a movement of said valve to a non-diverting position, and means for varying the air circulation about said thermostatic means to selectively modify the temperatures in said heating jacket.

DAVID FIRTH.